(12) United States Patent
Wen et al.

(10) Patent No.: US 12,434,756 B2
(45) Date of Patent: Oct. 7, 2025

(54) SINGLE ACTUATOR PANEL LIFT AND CLAMP SYSTEM

(71) Applicant: Steering Solutions IP Holding Corporation, Saginaw, MI (US)

(72) Inventors: Shenbing (Assur) Wen, Jiangsu (CN); Donald A. Buzzard, Saginaw, MI (US); Dianxin Zheng, Jiangsu (CN); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/640,644

(22) Filed: Apr. 19, 2024

(65) Prior Publication Data
US 2024/0351628 A1    Oct. 24, 2024

Related U.S. Application Data

(60) Provisional application No. 63/461,113, filed on Apr. 21, 2023.

(51) Int. Cl.
*B62D 1/184* (2006.01)
*B62D 1/19* (2006.01)

(52) U.S. Cl.
CPC .............. *B62D 1/184* (2013.01); *B62D 1/192* (2013.01)

(58) Field of Classification Search
CPC .......... B62D 1/16; B62D 1/184; B62D 1/192; B62D 1/195
See application file for complete search history.

(56) References Cited

U.S. PATENT DOCUMENTS

| | | | |
|---|---|---|---|
| 2018/0111640 A1* | 4/2018 | Bodtker | B62D 1/181 |
| 2019/0100242 A1* | 4/2019 | Bodtker | B62D 1/195 |
| 2020/0398885 A1 | 12/2020 | Pichonnat et al. | |
| 2021/0403074 A1 | 12/2021 | Anspaugh et al. | |

FOREIGN PATENT DOCUMENTS

WO    WO-2004016492 A1 *   2/2004   ............. B62D 1/184

OTHER PUBLICATIONS

Grams, WO-2004016492-A1, Machine Translation of Specification (Year: 2004).*

* cited by examiner

*Primary Examiner* — Paul N Dickson
*Assistant Examiner* — Matthew Joseph Ganci
(74) *Attorney, Agent, or Firm* — Dickinson Wright PLLC

(57) ABSTRACT

An axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket.

8 Claims, 5 Drawing Sheets

SINGLE ACTUATOR PANEL LIFT AND CLAMP SYSTEM

CROSS-REFERENCE TO RELATED APPLICATION

This application claims the benefits of priority to U.S. Provisional Patent Application Ser. No. 63/461,113, filed Apr. 21, 2023, the disclosure of which is incorporated by reference herein in its entirety.

TECHNICAL FIELD

The following description relates to vehicle steering systems and, more particularly, to a locking mechanism for such steering systems.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points.

In addition to providing adjustability, axially adjustable steering column assemblies may also include a collapsible functionality that provides safety advantages during an energy absorption event. A locking mechanism may be required to maintain a moveable portion of the steering column assembly at a desired position after axial adjustment. One type of commonly used locking mechanism in the automotive industry is called a telescoping positive lock mechanism. When designing a telescoping positive lock mechanism, attention is typically paid to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Accordingly, there is a continuing need to improve the operational framework of locking mechanisms to improve upon packaging, load requirements, and dependability.

SUMMARY

According to one aspect of the disclosure, an axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket. The locking mechanism includes an energy absorbing strap defining a first series of teeth extending axially and a second series of teeth extending axially. The locking mechanism also includes a first cam having a plurality of teeth engageable with the first series of teeth in the locked position and disengaged from the first series of teeth in the unlocked position. The locking mechanism further includes a second cam having a plurality of teeth engageable with the second series of teeth in the locked position and disengaged from the second series of teeth in the unlocked position.

According to another aspect of the disclosure, an axially adjustable steering column includes a first jacket. The steering column also includes a second jacket, wherein the first jacket is axially adjustable relative to the second jacket. The steering column further includes an adjustment lever. The steering column yet further includes a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
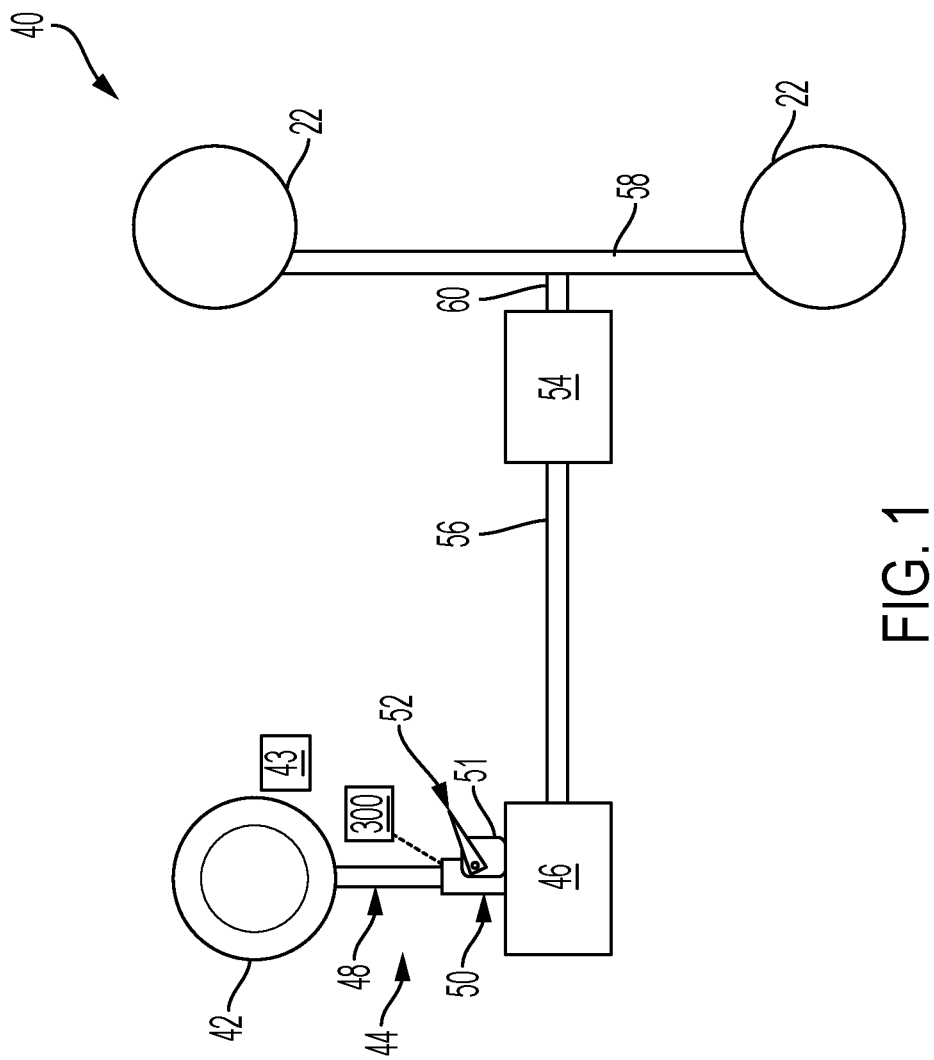
FIG. 1 schematically depicts a steering system including an adjustable steering column assembly.

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, the Figures illustrate embodiments of a steering column assembly that is axially adjustable and includes a locking mechanism with improved dependability and other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable over a range of positions from an extended position to a retracted position. While it is contemplated that the second jacket 50 may be axially adjustable, the first jacket 48 is axially adjustable relative to the second jacket 50 to at least partially define the extended and retracted positions of the steering column assembly 44. For example, the first jacket 48 may be referred to as an "upper jacket" and the second jacket 50 may be referred to as a "lower jacket".

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22. In other embodiments, the steering column assembly 44 is not directly mechanically connected to the steering gear assembly 54. Such an embodiment may be referred to as a steer-by-wire system.

Figure 2:
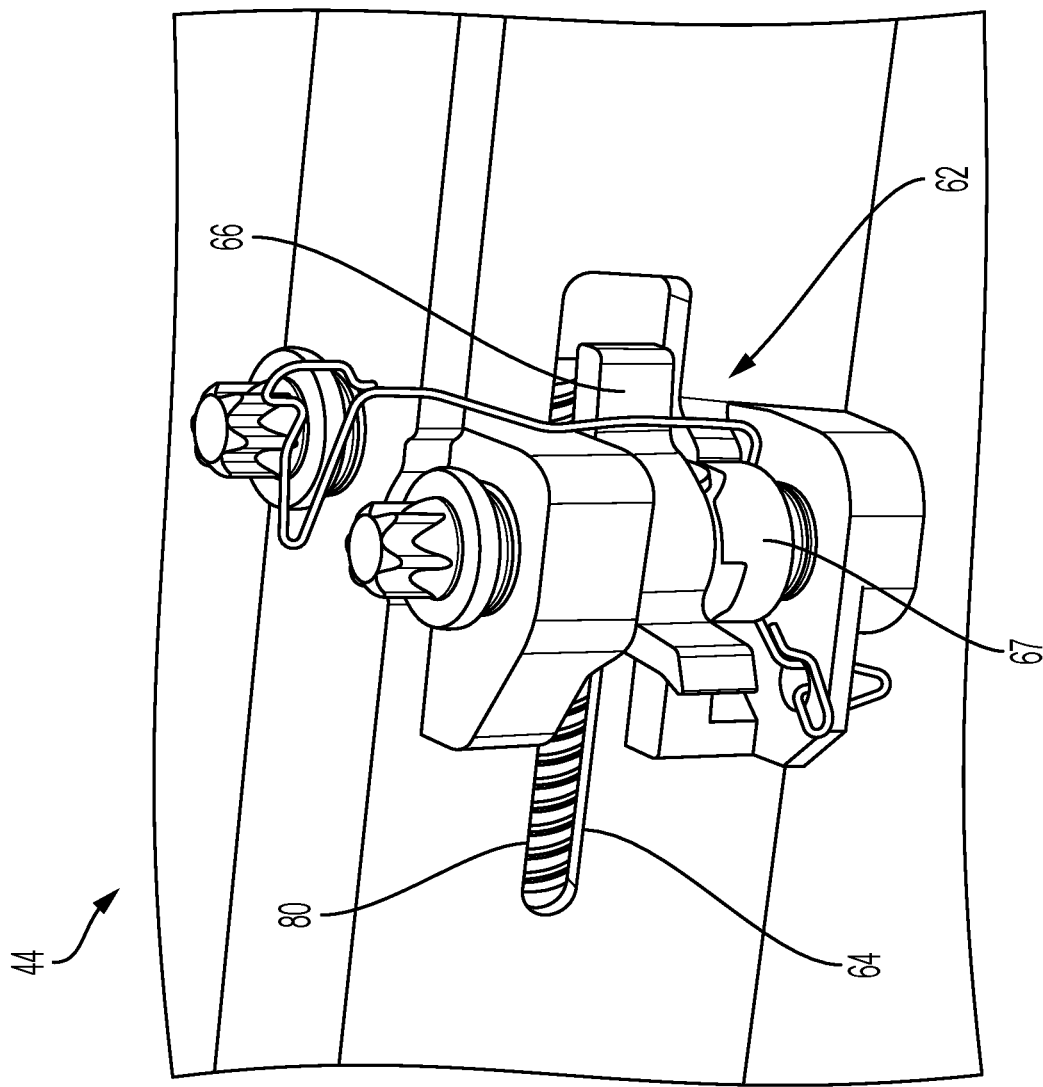
FIG. 2 is a perspective view of a portion of the adjustable steering column assembly illustrating a locking mechanism.

FIG. 2 generally illustrates a portion of the adjustable steering column assembly 44 with a dual direction locking mechanism 62. The adjustable lever 52 is operatively coupled to the dual direction locking mechanism 62, but is not illustrated for clarity of the locking mechanism 62. The lever 52 includes a portion which contacts the locking mechanism 62 to selectively move the locking mechanism 62 between a locked position (FIGS. 5, 6, 9 and 11) and an unlocked position (FIGS. 7, 8, 10 and 12), as described herein.

Figure 3:
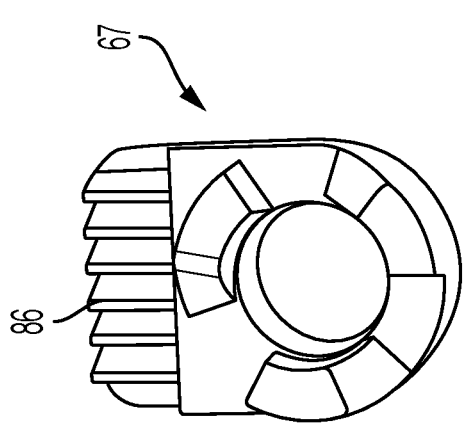
FIG. 3 is a perspective view of a first cam member of the locking mechanism.
Figure 4:
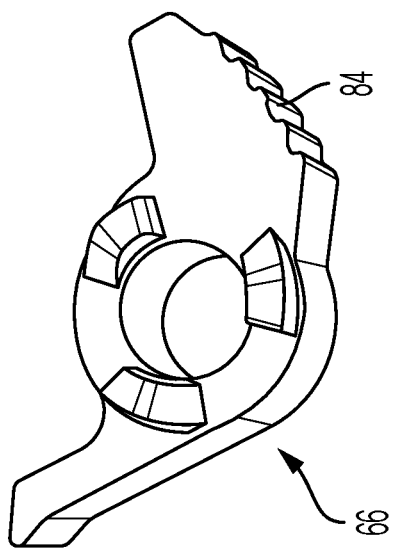
FIG. 4 is a perspective view of a second cam member of the locking mechanism.

Referring now to FIGS. 2-4, the locking mechanism 62 includes an energy absorbing strap 64, a first cam 66, and a second cam 67. In some embodiments, the first cam 66 and the second cam 67 are formed of identical materials, while other embodiments utilize different materials. The material choice may allow for different locking forces to be achieved. Regardless of the materials, in a locked position of the locking mechanism 62 (FIGS. 5, 6, 9 and 11), the first cam 67 and the second cam 67 are engaged with the energy absorbing strap 64. Engagement between the cams 66, 67 and the energy absorbing strap 64 may be made with tooth-to-tooth contact, as illustrated and described herein, or in any other suitable manner. By way of a non-limiting alternative example, the locking engagement may be made with the teeth of the cams 66, 67 fitting within slots, other openings or recesses defined by the energy absorbing strap 64. By way of another non-limiting alternative example, the cams 66, 67 may define slots, other openings or recesses that receive teeth or other protrusions extending from the energy absorbing strap 64. In an unlocked position of the locking mechanism 62 (FIGS. 7, 8, 10 and 12), the cams 66, 67 are spaced from the energy absorbing strap 64 to ensure disengagement.

Figure 6:
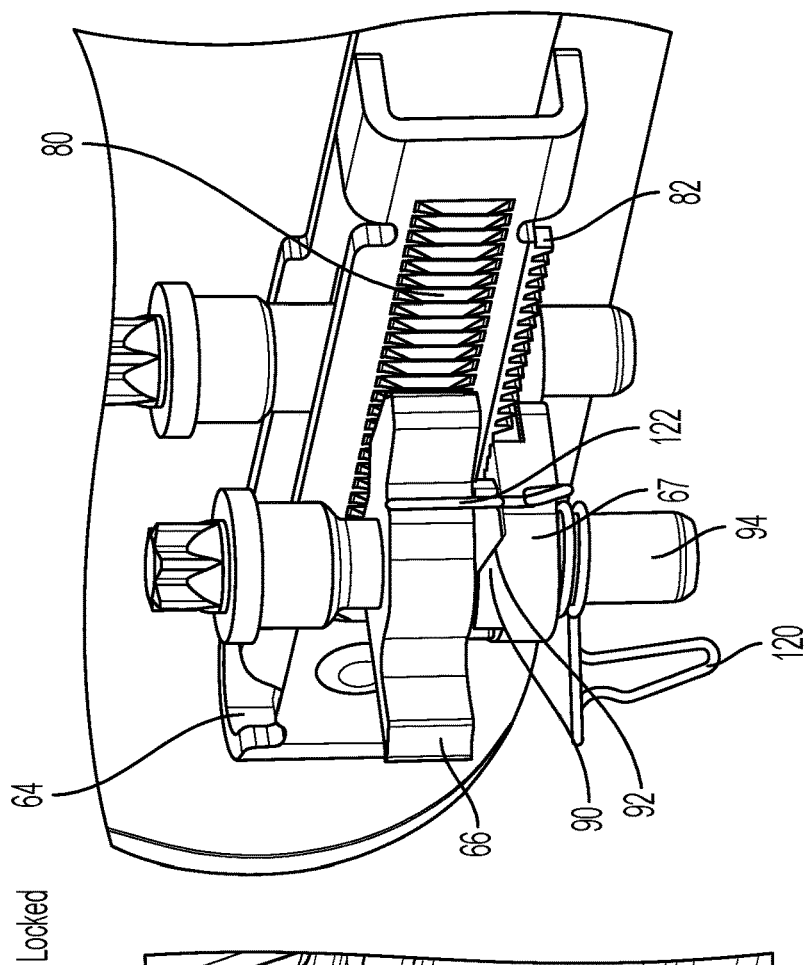
FIG. 6 is a second perspective view of the locking mechanism in the locked position with a lower jacket removed for illustration purposes.
Figure 5:
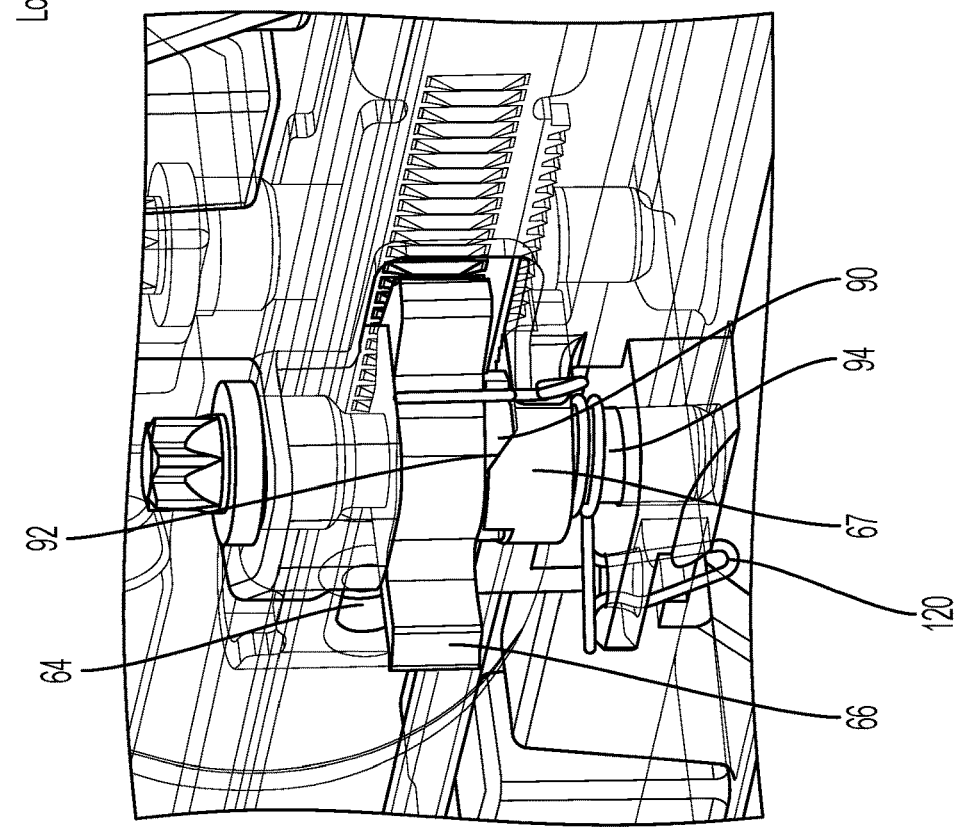
FIG. 5 is a first perspective view of the locking mechanism in a locked position.
Figure 8:
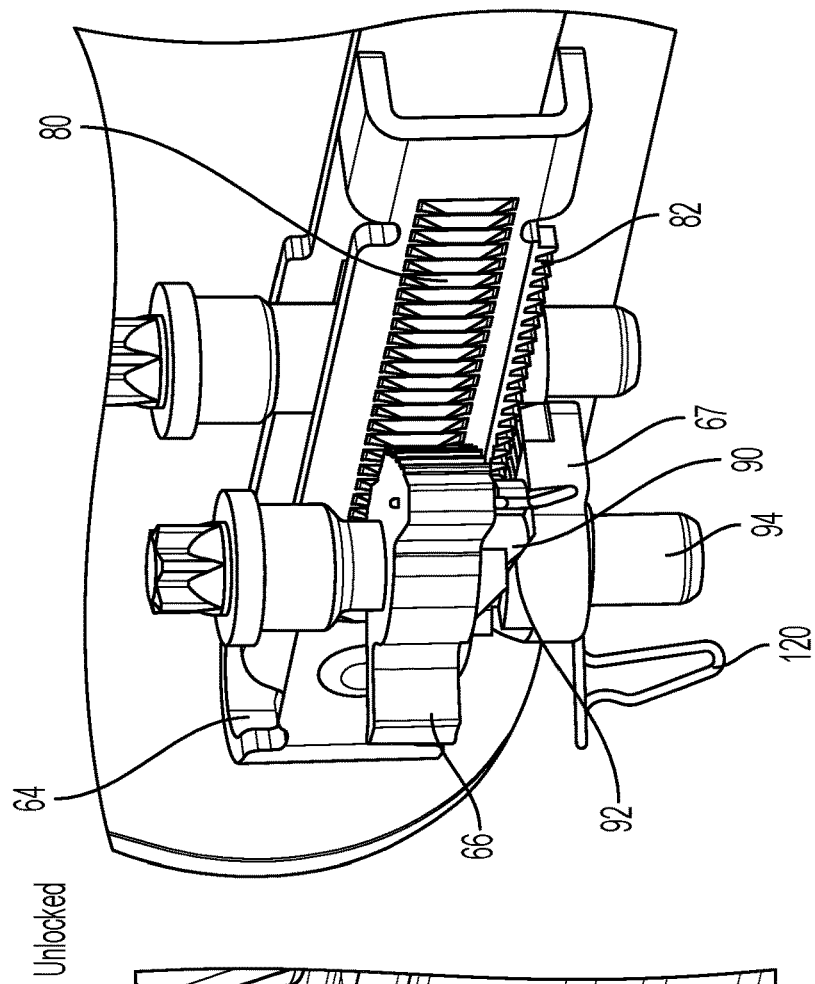
FIG. 8 is a second perspective view of the locking mechanism in the unlocked position with the lower jacket removed for illustration purposes.
Figure 7:
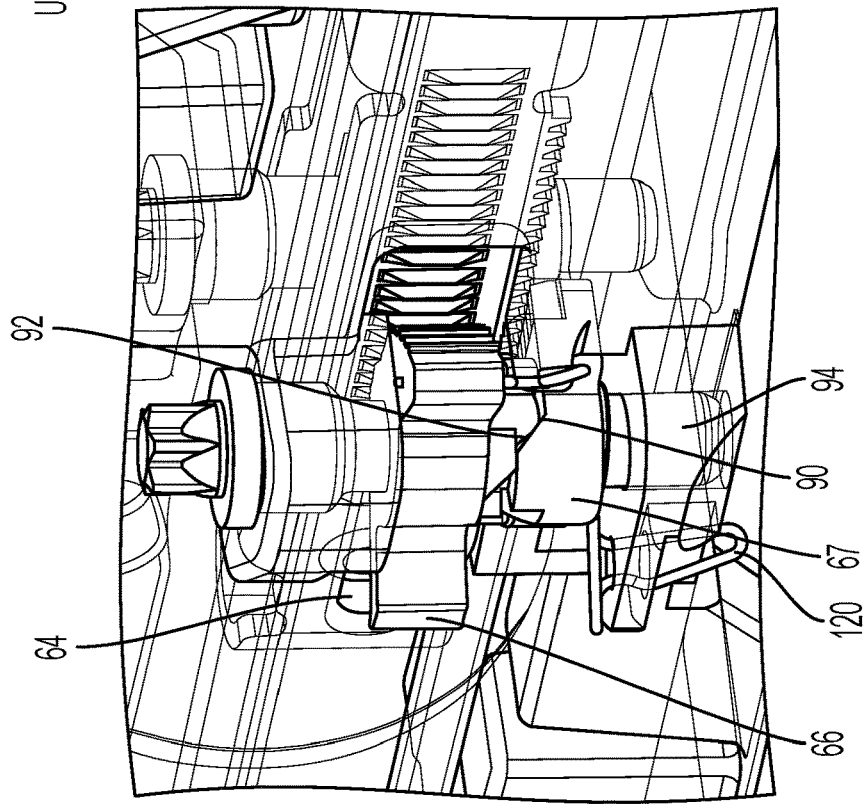
FIG. 7 is a first perspective view of the locking mechanism in an unlocked position.
Figure 9:
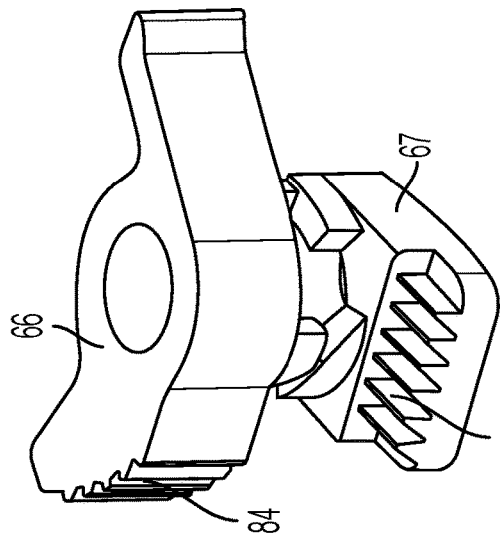
FIG. 9 is a perspective view of a first cam and a second cam of the locking mechanism in the locked position.
Figure 11:
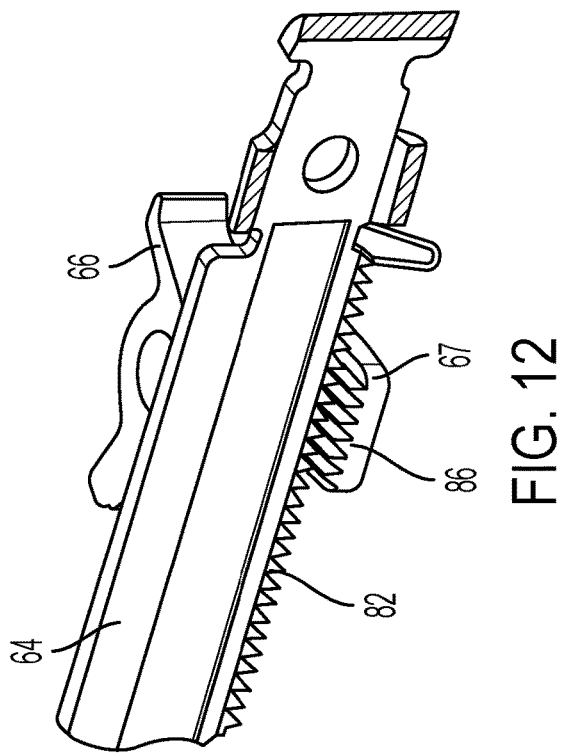
FIG. 11 is a perspective view of the locking mechanism in the locked position.
Figure 10:
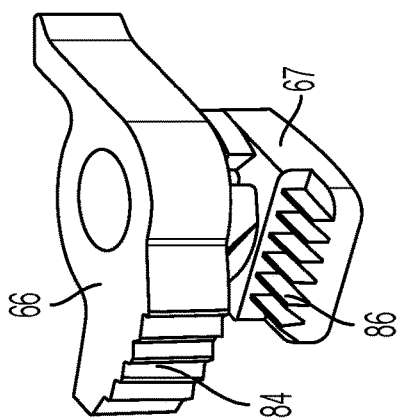
FIG. 10 is a perspective view of the first cam and the second cam of the locking mechanism in the unlocked position.
Figure 12:
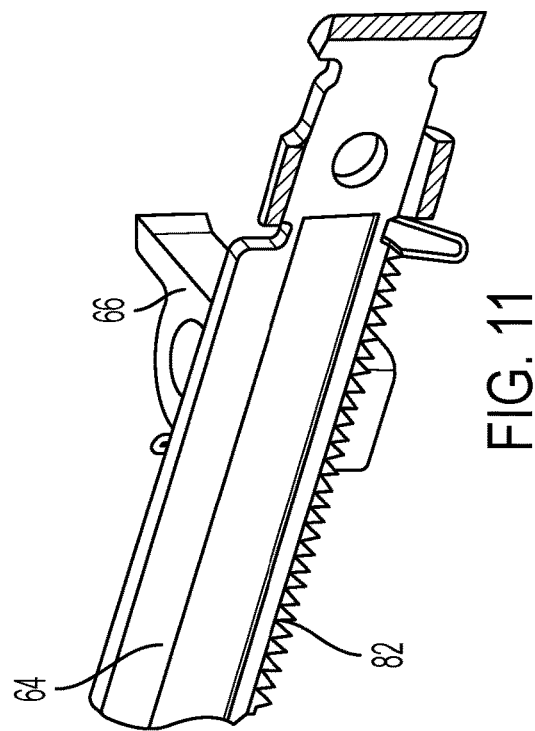
FIG. 12 is a perspective view of the locking mechanism in the unlocked position.

Referring to FIGS. 5 and 6, the energy absorbing strap 64 defines a first series of teeth 80 and a second series of teeth 82. The first series of teeth 80 form a first axially extending track of teeth on the energy absorbing strap 64. The second series of teeth 82 form a second axially extending track of teeth on the energy absorbing strap 64. The term "axially extending" refers to a direction substantially parallel to the longitudinal axis of the steering column assembly 44. The teeth of the first series of teeth 80 are oriented at an angle that is different than an orientation angle of the second series of teeth 82. The first series of teeth are disposed on a first surface of the energy absorbing strap 64 and the second series of teeth are disposed on a second surface (i.e., different than first surface) of the energy absorbing strap 64. In some embodiments, the first surface and the second surface are oriented substantially perpendicular to each other.

Referring now to FIGS. 3-6, the first cam 66 defines a first tooth set 84 that is intermeshed with the first series of teeth 80 in the locked position. Similarly, the second cam 67 defines a second tooth set 86 that is intermeshed with the second series of teeth 82 in the locked position. Due to the first series of teeth 80 and the second series of teeth 82 being oriented at different angles, engagement of the first tooth set 84 of the first cam 66 and the first series of teeth 80 of the energy absorbing strap 64 provides locking in a first axial direction of the steering column assembly 44, while engagement of the second tooth set 86 of the second cam 67 and the second series of teeth 82 of the energy absorbing strap 64 provides locking in a second axial direction of the steering column assembly 44 that is opposite to the first axial direction. In other words, one of the cams 66 or 67 resists movement in a "telescope-in" direction of the first jacket 48, while the other of the cams 66 or 67 resists movement in a "telescope-out" direction of the first jacket 48. Therefore, the locking mechanism 62 is referred to as a dual direction locking mechanism that utilizes separate tracks of teeth.

Referring now to FIGS. 5-12, in operation, as the adjustable lever 52 is rotated from a locked position (i.e., steering column assembly 44 cannot be adjusted) to an unlocked position (i.e., the steering column assembly 44 can be adjusted), the lever 52 or an intermediary component contacts the first cam 66 and rotates the first cam 66 to disengage the first tooth set 84 of the first cam 66 from the first series of teeth 80 of the energy absorbing strap 80. During rotation of the first cam 66 toward the unlocked position, a first cam surface 90 of the first cam 66 rotates relative to a second cam surface 92 of the second cam 67. In particular, the first cam 66 is rotatably supported on a pin to allow the teeth 84 of the first cam 66 to rotate into and out of engagement with the first series of teeth 80 of the energy absorbing strap 64, while the second cam 67 is supported on the pin to allow the teeth 86 of the second cam 67 to translate into and out of engagement with the second series of teeth 82 of the energy absorbing strap 64. The second cam 67 translates along the pin, bolt or the like 94—which the first cam 66 rotates about—to disengage the second tooth set 86 from the second series of teeth 82. As such, the adjustable lever 52 does not directly interface with the energy absorbing strap 64, but instead locks and unlocks the steering column assembly 44 with the cams 66, 67. In the unlocked position, movement of the steering column assembly 44 is permitted, where the upper jacket 48 may be movable relative to the lower jacket 50.

Referring to FIGS. 5-8, 11 and 12, a biasing member 120, such as a torsion spring, rotationally biases the cams 66, 67 toward the locked position of the locking mechanism 62. In particular, the biasing member 120 includes a first spring leg 122 in contact with the first cam 66 to bias the first cam 66 into the locked position and, consequently, the second cam 67 into the locked position. The biasing force is selected to prevent movement to the unlocked position until such force is overcome by movement of the lever 52. While a torsion spring is noted as an example of the biasing member 120, it is to be understood that any suitable component which biases the cams 66, 67 toward the locked position may be utilized.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An axially adjustable steering column comprising:
   a first jacket;
   a second jacket, wherein the first jacket is axially adjustable relative to the second jacket;
   an adjustment lever;
   a locking mechanism, wherein the adjustment lever selectively moves the locking mechanism between a locked position and an unlocked position, wherein the locked position prevents axial adjustment of the first jacket relative to the second jacket in both axial directions, and the unlocked position allows adjustment of the first jacket relative to the second jacket, wherein the locking mechanism comprises:
      an energy absorbing strap defining a first series of teeth extending axially and a second series of teeth extending axially;
      a first cam having a plurality of teeth engageable with the first series of teeth in the locked position and disengaged from the first series of teeth in the unlocked position, wherein the first cam is rotatably supported on a pin to allow the plurality of teeth of the first cam to rotate into and out of engagement with the first series of teeth of the energy absorbing strap; and
      a second cam having a plurality of teeth engageable with the second series of teeth in the locked position and disengaged from the second series of teeth in the unlocked position, wherein the second cam is supported on the pin to allow the plurality of teeth of the second cam to translate into and out of engagement with the second series of teeth of the energy absorbing strap.

2. The axially adjustable steering column of claim 1, wherein the first series of teeth and the second series of teeth are disposed on respective surfaces of the energy absorbing strap which are oriented perpendicularly to each other.

3. The axially adjustable steering column of claim 1, wherein the first series of teeth and the second series of teeth are angled differently from each other.

4. The axially adjustable steering column of claim 1, wherein the first cam is rotationally biased toward the locked position with a biasing member in contact with the first cam.

5. The axially adjustable steering column of claim 4, wherein the biasing member is a torsion spring.

6. The axially adjustable steering column of claim 1, wherein the first cam and the second cam are formed of the same materials.

7. The axially adjustable steering column of claim 1, wherein the first cam and the second cam are formed of different materials.

8. The axially adjustable steering column of claim 1, wherein the first cam includes a first cam surface in contact with a second cam surface of the second cam, wherein rotational movement of the first cam toward the unlocked position translates the second cam.

* * * * *